United States Patent
Cho et al.

(10) Patent No.: US 11,528,402 B2
(45) Date of Patent: Dec. 13, 2022

(54) TERMINAL AND METHOD FOR SETTING DATA PROTOCOL FOR PHOTOGRAPHED IMAGE

(71) Applicant: Hanwha Techwin Co., Ltd., Seongnam-si (KR)

(72) Inventors: Sung Bong Cho, Seongnam-si (KR); Raman Sujith, Seongnam-si (KR); Il Hwang Cha, Seongnam-si (KR); Ramgopal Anumolu Tarak, Seongnam-si (KR); Rao Aravapalli Venkateswara, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 823 days.

(21) Appl. No.: 16/304,922

(22) PCT Filed: May 26, 2017

(86) PCT No.: PCT/KR2017/005547
§ 371 (c)(1),
(2) Date: Nov. 27, 2018

(87) PCT Pub. No.: WO2017/204598
PCT Pub. Date: Nov. 30, 2017

(65) Prior Publication Data
US 2021/0227124 A1     Jul. 22, 2021

Related U.S. Application Data

(60) Provisional application No. 62/342,339, filed on May 27, 2016.

(51) Int. Cl.
H04N 5/232     (2006.01)
B64C 39/02     (2006.01)

(52) U.S. Cl.
CPC ....... *H04N 5/23206* (2013.01); *B64C 39/024* (2013.01); *H04N 5/23296* (2013.01);
(Continued)

(58) Field of Classification Search
CPC ......... H04N 5/23206; H04N 5/232945; H04N 5/23299; H04N 5/23296; B64C 39/024; B64C 2201/127; B64C 2201/146
See application file for complete search history.

(56) References Cited

U.S. PATENT DOCUMENTS 9,516,229 B2   12/2016   Xu et al.
9,531,935 B2   12/2016   Niida
(Continued)

FOREIGN PATENT DOCUMENTS

JP   2013-258538 A   12/2013
JP   2016-502346 A   1/2016
(Continued)

OTHER PUBLICATIONS

Search Report dated Aug. 30, 2017 by the International Searching Authority in counterpart International Patent Application No. PCT/KR2017/005547. (PCT/ISA/210).
(Continued)

*Primary Examiner* — Yogesh K Aggarwal
(74) *Attorney, Agent, or Firm* — Sughrue Mion, PLLC

(57) ABSTRACT

According to an embodiment of the present disclosure, in a terminal, in addition to event information in the ONVIF format, information for determining rotation and information about a cropped region cropped from an original region are additionally transmitted.

16 Claims, 9 Drawing Sheets

(52) U.S. Cl.
CPC ... *H04N 5/23299* (2018.08); *H04N 5/232945* (2018.08); *B64C 2201/127* (2013.01); *B64C 2201/146* (2013.01)

(56) References Cited

U.S. PATENT DOCUMENTS

| | | |
|---|---|---|
| 2002/0057337 A1 | 5/2002 | Kumler |
| 2005/0152197 A1 | 7/2005 | Cho et al. |
| 2011/0072479 A1* | 3/2011 | Hsu .................. H04N 21/4223 725/110 |
| 2012/0179742 A1 | 7/2012 | Acharya et al. |
| 2013/0230224 A1* | 9/2013 | Claude ................ A61B 5/055 382/131 |
| 2017/0070660 A1 | 3/2017 | Niida et al. |
| 2017/0372748 A1* | 12/2017 | McCauley .......... H04N 21/439 |

FOREIGN PATENT DOCUMENTS

| | | |
|---|---|---|
| KR | 10-2012-0039164 A | 4/2012 |
| KR | 10-2013-0047439 A | 5/2013 |
| KR | 10-1451115 B1 | 10/2014 |
| KR | 10-2014-0132575 A | 11/2014 |
| KR | 10-1577409 B1 | 12/2015 |

OTHER PUBLICATIONS

Written Opinion dated Aug. 30, 2017 by the International Searching Authority in counterpart International Patent Application No. PCT/KR2017/005547. (PCT/ISA/237).

Communication dated Oct. 28, 2019 issued by the Korean Patent Office in counterpart Korean Application No. 10-2018-7034426.

* cited by examiner

810

```
<tt:Frame UtcTime="2017-01-10T12:24:57.231">
   <tt:Transformation>
       <tt:Translate  x="-1.0" y="-1.0"/>           ——— 910
       <tt:Scale  x="0.00625" y="0.00834"/>         ——— 920
       <tt:Rotate angle ="90"/>                     ——— 930
       <tt:Mirror mirror="True"/>                   ——— 940
       <tt:Crop x="240" y="0" cx="1440" cy="1080">  ——— 950
   </tt:Transformation>
   ...
<tt:Frame>
```

TERMINAL AND METHOD FOR SETTING DATA PROTOCOL FOR PHOTOGRAPHED IMAGE

TECHNICAL FIELD

The present disclosure relates to a method of setting an image data protocol in a terminal including a network camera.

BACKGROUND ART

In an analog camera, an image in which a motion detection area or a privacy mask area is set is transmitted to a DVR apparatus or an image output apparatus via a wired cable. Region information set in the analog camera is transmitted to an image output apparatus without additional change.

However, a network camera converts a captured image to a digital signal, encodes and compresses the digital signal, and transmits a conversion signal obtained via compression to an image output apparatus through a network.

An image output apparatus receives and decodes an encoded stream and outputs an image. However, while performing encoding and decoding, there may be a difference between the coordinate systems of a motion detection area, an ROI area, a VA (Video Analytics) area, a privacy mask area, or the like of an image output from the image output apparatus and the coordinate system of an image captured initially by a network camera. In addition, the network camera may perform, for example, rotation, mirroring, or cropping, in an encoding operation so as to convert an image to a different format from the image that is initially captured by the network camera.

DESCRIPTION OF EMBODIMENTS

Technical Problem

According to an embodiment of the present disclosure, a data modification value between an original image photographed using a network camera and an image on which encoding is performed is transmitted as metadata so as to eliminate the inconvenience of additionally checking information about an original image photographed using a network camera on the side of an image output apparatus.

According to another embodiment of the present disclosure, information indicating whether rotation has been done and information regarding portions cropped from an original area is transmitted in addition to event information in the ONVIF format.

According to another embodiment of the present disclosure, when a resolution of an original image photographed using a terminal is different from that of an image on which encoding is performed, or when a resolution of an original image photographed using a network camera is different from that of an image output apparatus, changes in the original image photographed using the network camera is set as a data protocol to transmit the changes. For example, changes such as scale, rotation, mirror, crop, flip, or the like are to be set as a data protocol.

According to another embodiment of the present disclosure, when photographing an image by using a terminal in which a drone, a robot or other rotational image sensors are mounted therein, constantly changing image angles or changes in a rotational angle of the image sensors are set as a data protocol to be transmitted.

According to another embodiment of the present disclosure, with respect to an encoding stream supporting, for example, Dynamic Crop, crop information is provided in units of frames or based on events generated so as to output an image to which Dynamic Cropping is applied, without an image output apparatus having to request additional information.

Solution to Problem

According to an aspect of the present disclosure, a method of setting a data protocol for an image photographed using a terminal, includes: detecting first region information from a coordinate system of an original image that is initially captured using the terminal; detecting second region information from a coordinate system of an encoding stream obtained by encoding the original image; incorporating, into metadata, information of conversion between the coordinate system of the original image and the coordinate system of the encoding stream or information of conversion between the first region information and the second region information, and transmitting the metadata, wherein the incorporating and the transmitting is performed by a transmitting unit of the terminal.

The information of conversion between the coordinate system of the original image and the coordinate system of the encoding stream may include at least one of a scale conversion value of an x-axis and a y-axis, a flip value of an x-axis and a y-axis, a mirror value of an x-axis and a y-axis, and a rotation value of an x-axis and a y-axis.

The rotation value may be an integer value indicating from −359 degrees to +359 degrees, and denotes a degree of x-axis rotation and y-axis rotation of the coordinate system of the original image, wherein a positive rotation value indicates clockwise rotation, and a negative rotation value indicates counterclockwise rotation.

The information of conversion between the first region information and the second region information may include region information of a region cropped from the first region, wherein the region information of the cropped region is represented by a horizontal length and a vertical length of the first region information and the cropped region.

When a resolution of the original image is different from a resolution of the encoding stream, or when a recording resolution of the original image is different from a reproduction resolution of a client terminal that receives and reproduces the encoding stream, the metadata may include region information of a region cropped from the first region information, and converted values of an x-axis scale value and a y-axis scale value.

A client terminal that receives and reproduces the encoding stream that supports Dynamic Cropping may determine from which region of the first region the cropped region is cropped, by using region information of the region cropped from the first region included in the metadata, in real time.

The transmitting unit of the terminal may transmit, with respect to each frame, information of conversion between the coordinate system of the original image and the coordinate system of the encoding stream or information of conversion between the first region information and the second region information.

When a rotatable image sensor is mounted on the terminal, every time a rotational angle of the image sensor changes, the transmitting unit of the terminal may transmit information of conversion between the coordinate system of the original image resulting from the changed rotational angle of the image sensor and the coordinate system of the encoding stream.

When a gyro sensor is mounted in the terminal, every time the gyro sensor detects a change in an image angle value of the terminal, the transmitting unit of the terminal may transmit information of conversion between the coordinate system of the original image resulting from the change in the image angle value of the terminal and the coordinate system of the encoding stream. The terminal may be a drone.

A client unit that receives the metadata and an image stream transmitted by the transmitting unit of the terminal may be capable of storing together the received image stream and the first region information that is determined based on the metadata.

A data protocol for the image photographed using the terminal may comply with the ONVIF standard.

Advantageous Effects of Disclosure

According to an embodiment of the present disclosure, a data difference value between an original image photographed using a network camera and an image on which encoding is performed is transmitted as metadata to thereby eliminate the inconvenience of having to additionally check information about the original image captured using the network camera in an image output apparatus.

BEST MODE

Figure 1:
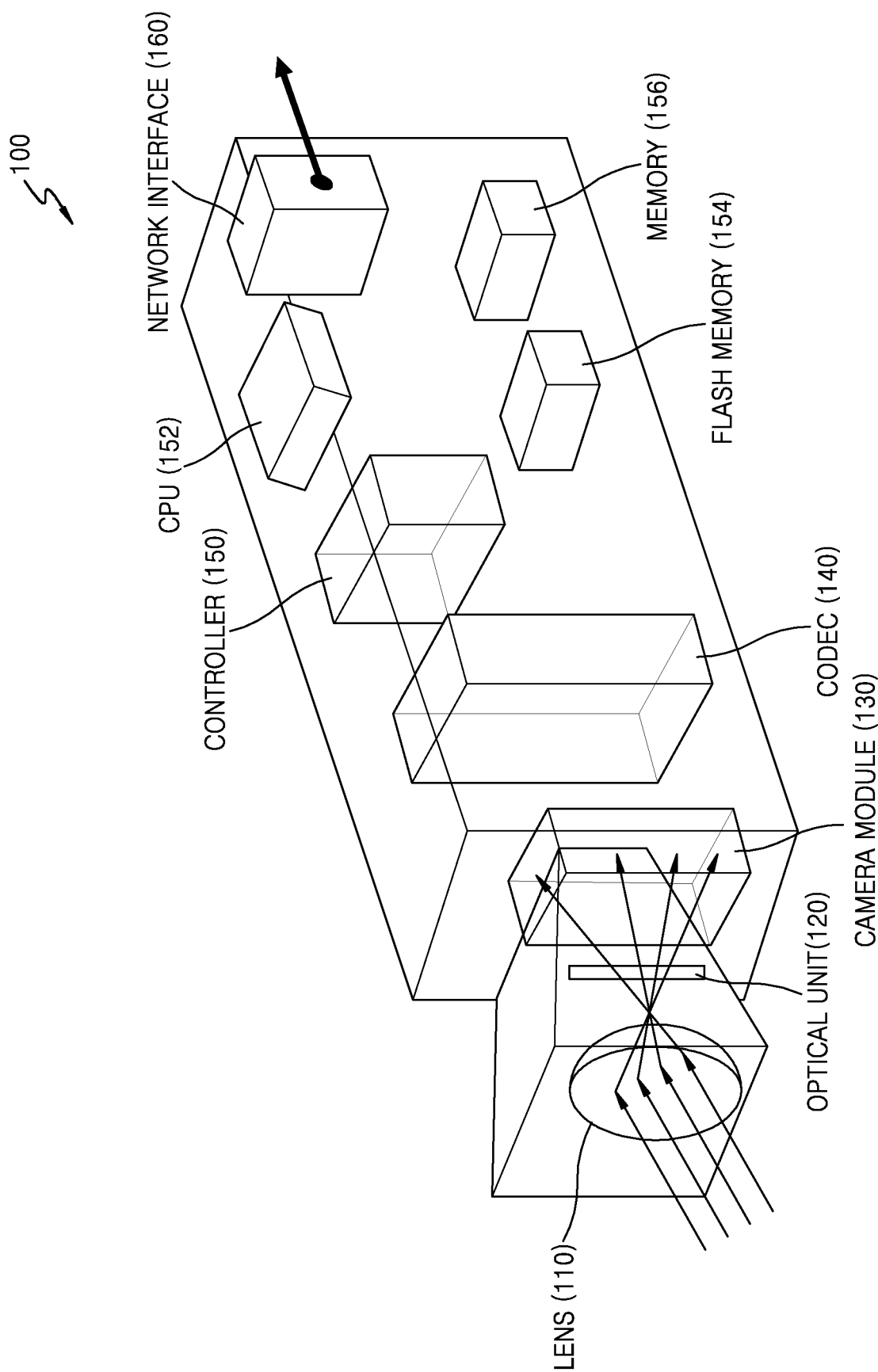
FIG. 1 is an internal structural diagram of a network camera according to an embodiment of the present disclosure.

According to another embodiment of the present disclosure, there is provided a method of setting a data protocol for an image photographed using a terminal, the method including: detecting first region information from a coordinate system of an original image that is initially captured using the terminal; detecting second region information from a coordinate system of an encoding stream obtained by encoding the original image; setting information of conversion between the coordinate system of the original image and the coordinate system of the encoding stream of the terminal based on a setting value received from a client that receives and reproduces the encoding stream of the terminal; and transmitting information of conversion between the coordinate system of the original image and the coordinate system of the encoding stream or information of conversion between the first region information and the second region information, wherein the transmitting is performed by a transmitting unit of the terminal.

MODE OF DISCLOSURE

The present disclosure will now be described more fully with reference to the accompanying drawings, in which embodiments of the present disclosure are shown. The embodiments of the present disclosure are provided so that this disclosure will be thorough and complete to those skilled in the art. Since the present disclosure may have various modifications and several embodiments, particular embodiments are shown in the drawings and will be described in detail.

FIG. 1 is an internal structural diagram of a network camera according to an embodiment of the present disclosure.

According to an embodiment of the present disclosure, a method of setting a data protocol for an image photographed using a terminal is disclosed. Examples of the terminal include a network camera, a mobile phone, a smartphone, a wearable device, a hand-held device, a smartwatch, a robot, a drone, a camera, a PTRZ (Pent-Tin-Roll-Zoom) camera and other apparatuses having an image capturing function.

According to an embodiment of the present disclosure, an original image photographed using a lens 110, an optical unit 120, and a camera module 130 of a network camera 100 is converted to a digital signal. A codec 140 performs encoding on the digital signal to convert the same to a compressed encoding stream such as MPEG, H.264, H.265 or the like, and then transmits the encoding stream in the form of a network packet to a client via a network interface 160. The client decodes the encoding stream from the received network packet and outputs an image.

The network camera 100 controls the lens 110, the optical unit 120, the camera module 130, the codec 140, a flash memory 154, a memory 156, and the network interface 160 via a controller 150 or a CPU 152. The encoded stream and metadata may be stored in the flash memory 154 or the memory 156.

According to an embodiment of the present disclosure, metadata includes a data protocol for a photographed image, and the data protocol for the photographed image includes information of conversion between the coordinate system of an original image and the coordinate system of the encoding stream or information of conversion between first region information and second region information. A specific example thereof includes scale, Rotate, Mirror, Crop or the like illustrated in FIG. 9, and also includes, for example, Flip.

Figure 3:
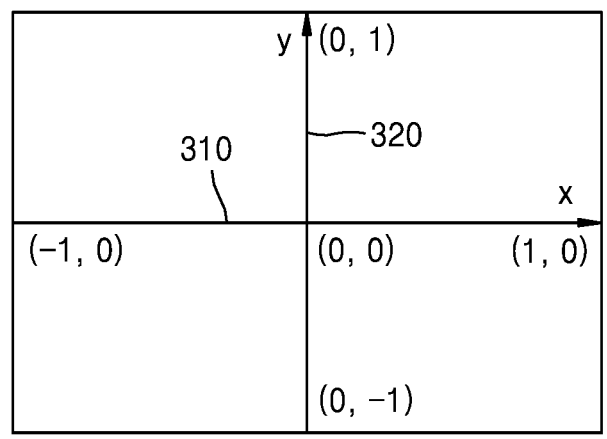
FIG. 3 illustrates an example of normalized coordinate systems used in an ONVIF (Open Network Video Interface Forum) according to an embodiment of the present disclosure.

As an embodiment of the present disclosure, the embodiment of FIG. 3 will be referred to regarding scale information.

According to an embodiment of the present disclosure, rotation information may be set to an integer value between −359 degrees to +359 degrees. In this case, a rotation value indicates a degree of x-axis rotation and y-axis rotation of the coordinate system of an original image photographed by a terminal. A positive rotation value indicates clockwise rotation, and a negative rotation value indicates counterclockwise rotation.

According to another embodiment of the present disclosure, rotation information may be configured using a vector. According to an embodiment, a value of 90 degree-rotation represented by a vector may be displayed as below.

<Rotate a="cos(90)", b="-sin(90)", c="sin(90)", d="cos(90)">

$$\begin{pmatrix} COS\Theta & -SIN\Theta \\ SIN\Theta & COS\Theta \end{pmatrix} \begin{pmatrix} x \\ y \end{pmatrix} = \begin{pmatrix} x' \\ y' \end{pmatrix}$$ [Equation 1]

According to an embodiment of the present disclosure, rotation information may be configured by using a vector as shown in Equation 1. Equation 1 denotes a rotational conversion matrix rotated by $\Theta$.

According to an embodiment of the present disclosure, Mirror information, Flip information are indicated by "True" or "False" by using a Boolen variable. When performing mirroring, it is represented as below.

<tt: Mirror mirror="True">

According to an embodiment of the present disclosure, crop information is used when an image cut from an original image is used. A cropped image is represented by x and y and cx and xy of an original image. A start point of the coordinate system is sent to x, y, and cx and cy respectively denote a horizontal length and a vertical length of a region.

Figure 2:
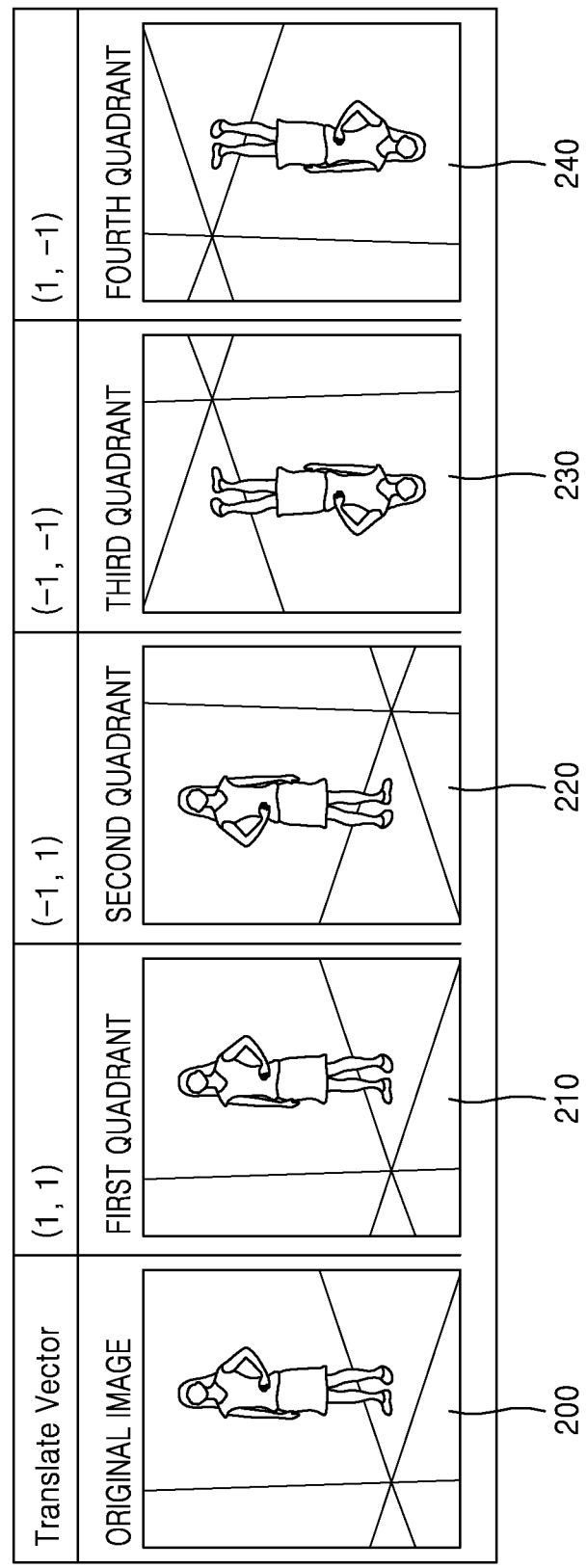
FIG. 2 illustrates an example of conversion performed in an encoding operation of a network camera, according to an embodiment of the present disclosure.

FIG. 2 illustrates an example of conversion performing in an encoding process of a network camera according to an embodiment of the present disclosure.

According to ONVIF, information is transmitted to tt:Frame. According to ONVIF, information of conversion between the coordinate system of an original image and the coordinate system of an encoding stream may be represented using a Translate instruction.

Translate indicates a phase change in the coordinate system. Translate is a vector value, and in a first quadrant, Translate has a coordinate system 210 having an identical encoding stream as that of a coordinate system 200 of an original image.

A Translate vector in a second quadrant has a coordinate system 220 of a horizontally symmetrical image. A Translate vector in a third quadrant has a coordinate system 230 of a vertically symmetrical image. A Translate vector in a fourth quadrant has a coordinate system 240 of a vertically inverted symmetrical image.

According to an embodiment of the present disclosure, a Translate vector is represented as Translate Vector=(1, 1)(210) in a first quadrant, as Translate Vector=(1, 1)(220) in a second quadrant, as Translate Vector=(1, 1)(220) in a third quadrant, and as Translate Vector=(1, 1)(240) in a fourth quadrant.

FIG. 3 illustrates an example of normalized coordinates used in an ONVIF (Open Network Video Interface Forum) according to an embodiment of the present disclosure.

According to ONVIF, data is transmitted to a display of a client terminal based on the coordinate system of an encoded stream. FIG. 2 illustrates an example in which a region normalized to (−1,1), (1,1), (1,−1), and (−1,−1) based on an encoded stream in the ONVIF is illustrated.

In an image size converting method, a width value and a height value are normalized to 2 which is an absolute value from −1 to 1.

It is processed as (Width)×(scale:x)=2, (Height)×(scale:y)=2. Accordingly, it results in (scale:x)=2/(Width), (scale:y)=2/(Height). As for an image having a horizontal length (width) of 640, scale:x=2/640=0.003125. As for an image having a vertical length (height) of 480, scale:y=2/480=0.0041667.

According to an embodiment of the present disclosure, when first region information of (0, 0) to (320, 420) in the coordinate system of an original image that is initially captured using a terminal is to the coordinate system used in ONVIF, the first region information is converted as follows.

An X-axis 310 in the ONVIF coordinate system has a distance of 2 from the point of −1 to point of 1.

In this case, a normalized scale X axis-value is 2/320=0.00625.

A Y-axis 320 in the ONVIF coordinate system has a distance of 2 from the point of −1 to point of 1.

In this case, a normalized scale Y-axis value is 2/240=0.00834.

Figure 4:
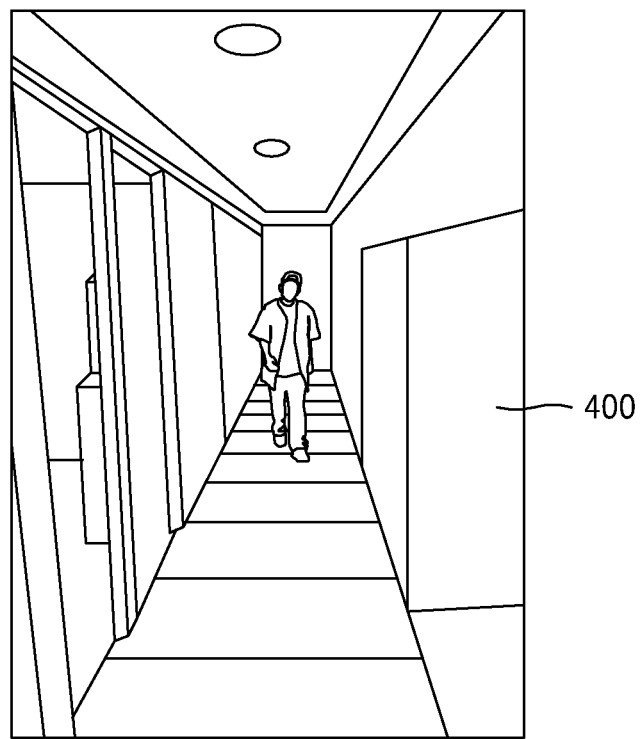
FIG. 4 illustrates an example of a hallway view according to an embodiment of the present disclosure.

FIG. 4 illustrates an example of a hallway view according to an embodiment of the present disclosure. In the case of a hallway view like the embodiment of FIG. 4, a function of automatically rotating an image that is initially captured by a terminal is applied. Rotation of 90 degrees is frequently set when setting an image sensor value used in a terminal.

Figures 8, 9:
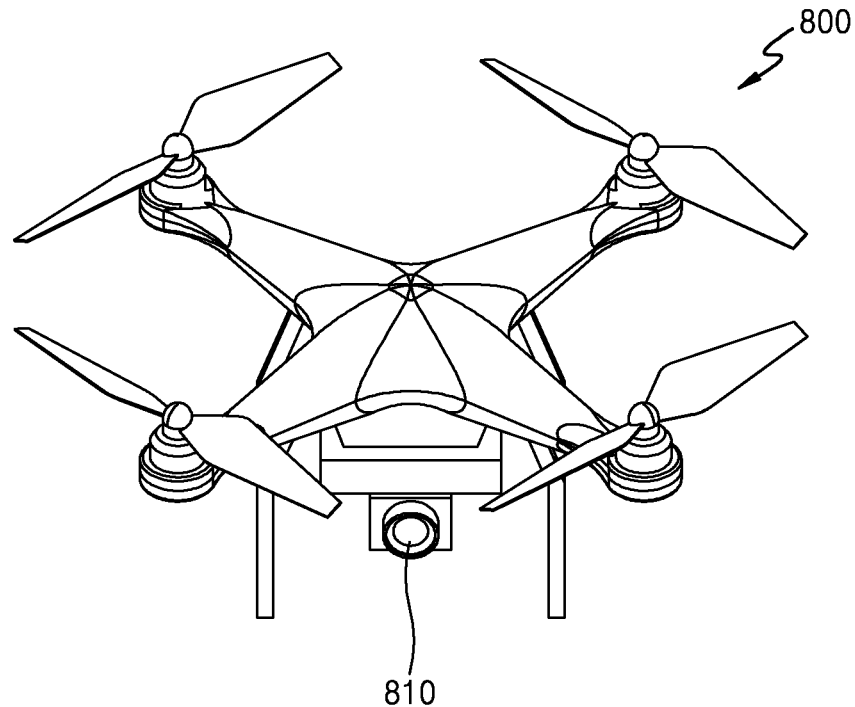
FIG. 8 illustrates an example of a drone according to an embodiment of the present disclosure.
FIG. 9 illustrates an example of setting a data protocol according to the ONVIF standard, according to an embodiment of the present disclosure.

However, recently, in the case of a camera (FIG. 8, 810) that is mounted in a mobile terminal or a movable apparatus like a drone 800 illustrated in FIG. 8 and uses a rotatable image sensor, a rotational angle value may be modified continuously.

According to an embodiment of the present disclosure, a rotation value indicating a rotational angle of an image sensor may be set to an integer value from −359 to +359. In this case, a rotation value indicates a degree of rotation about an x-axis or a y-axis of the coordinate system of an original image photographed by a terminal, and a positive rotation value denotes clockwise rotation, and a negative rotation value denotes counterclockwise rotation.

In addition, according to an embodiment of the present disclosure, a rotation value is not set to a fixed value in advance, but a rotation value may be set each time when a rotational angle of an image sensor is detected. Alternatively, information about a rotational angle that is set in preset units of time, in preset units of events or in other various manners set by a user and detected from an image sensor may be transmitted.

When an image is transmitted from the drone as the embodiment FIG. 8, for each image frame or each time when detecting a rotational angle of an image sensor, a rotation value may be transmitted together as metadata.

Figure 5:
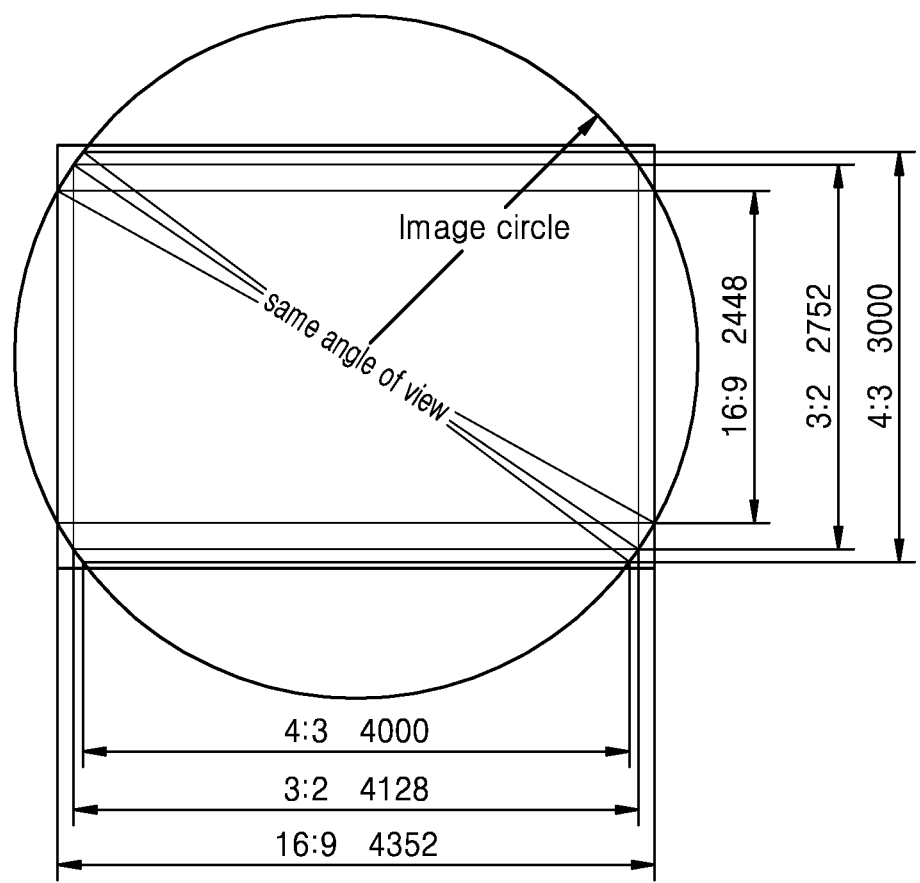
FIGS. 5 through 7 illustrate examples with different resolutions, according to an embodiment of the present disclosure.
Figure 6:
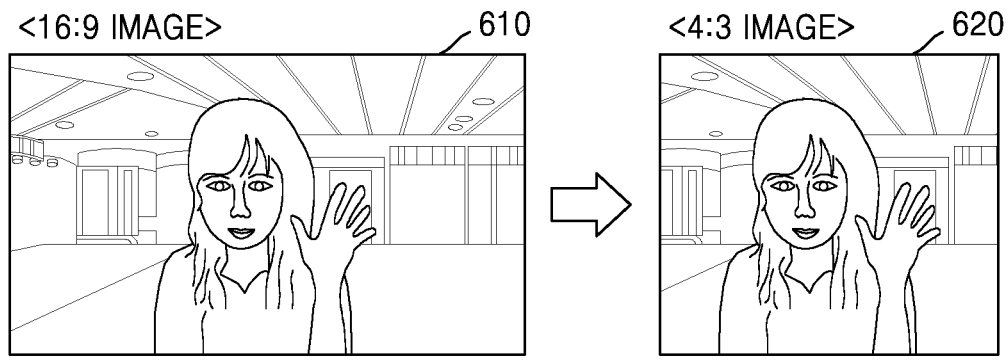
Figure 7:
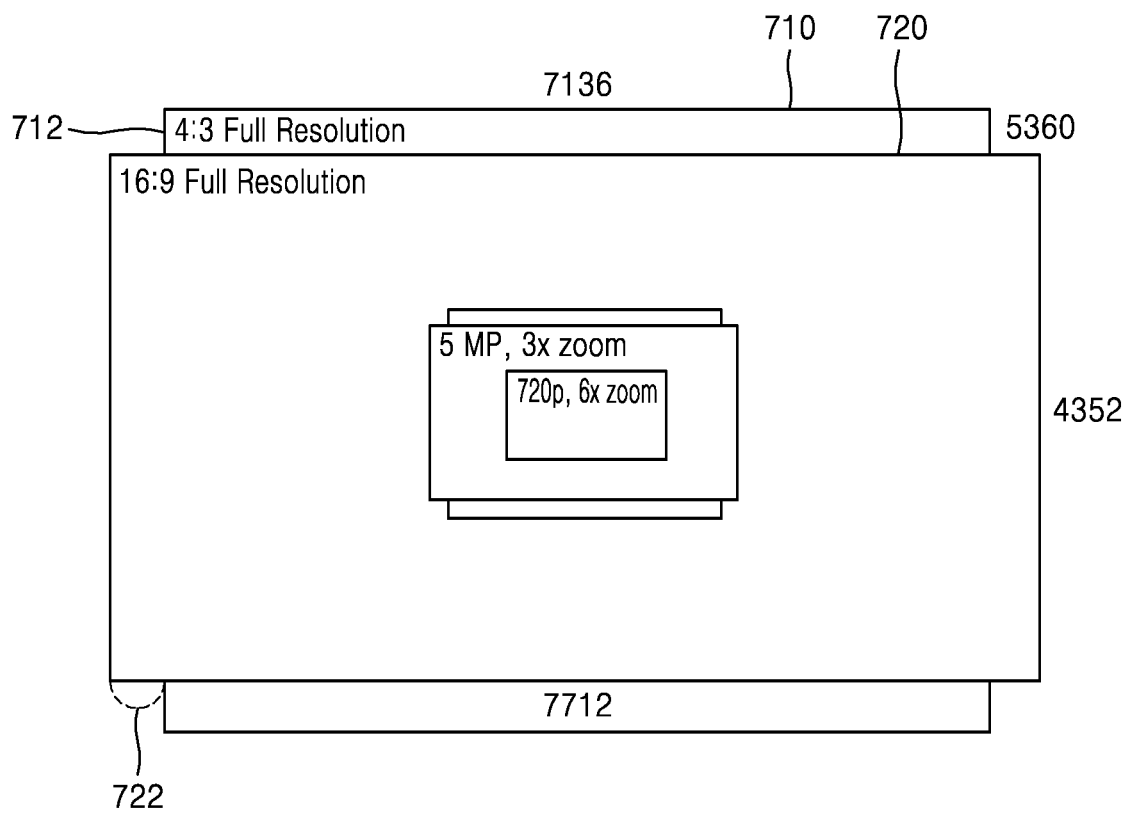

FIGS. 5 through 7 illustrate an example with different resolutions according to an embodiment of the present disclosure.

FIG. 5 illustrates an example with resolutions of 4:3, 3:2, and 16:9. At a resolution of 4:3, region information is 4000:3000; at a resolution of 3:2, region information is 4128:2752; at a resolution is 16:9, region information is 4352:2448.

FIG. 6 illustrates an embodiment of the present disclosure, showing an example where a resolution of an original image 610 photographed using a terminal is 16:9, and a resolution of an output image 620 output from an encoder is 4:3.

According to an embodiment of the present disclosure, in order to obtain a stream 620 encoded at 4:3 without distortion from a terminal having a 16:9 image sensor, crop is to be conducted on the original image 610. In the embodiment of FIG. 6, in order to prevent image distortion, left and right regions of the original image 610 are to be cut, and image compression is to be performed on the image.

In order to crop the original image 610, the image is cropped from center portions of an image sensor. In the case of FIG. 6, 240 pixels of a horizontally symmetrical region are removed.

FIG. 7 illustrates an example in which an image 710 at a resolution of 4:3 and an image 720 at a resolution of 16:9 are overlapped. As illustrated in FIG. 7, cropping is to be performed on a width 722 and a length 712.

According to an embodiment of the present disclosure, when a resolution of an original image photographed using a terminal is different from that of an encoding stream in an encoding operation as in the embodiment illustrated in FIGS. 5 through 7, or when a resolution of an original image photographed using a terminal is different from a resolution of a client terminal that receives and reproduces the image, or when a resolution of an encoding stream is different from a resolution of a client terminal that receives and reproduces an image, cropping is required in each case, and a scale value may have to be additionally adjusted.

According to an embodiment, when operating at 1920×1080 in a 16:9 image, which is an original image, Scale.x=0.001041667, Scale.y=0.0018519, and Crop.x=0, Crop.y=0, Crop.cx=1920, Crop.cy=1080.

According to another embodiment of the present disclosure, when operating at 1440×1080 from 16:9, which is the resolution of the original image, Scale.x=0.0013889, Scale.y=0.0018519, and Crop.x=240, Crop.y=0, Crop.cx=1440, Crop.cy=1080.

According to another embodiment of the present disclosure, when operating at 640×480 from 16:9, which is the resolution of the original image, Scale.x=0.003125, Scale.y=0.004167, and Crop.x=240, Crop.y=0, Crop.cx=1440, Crop.cy=1080.

According to an embodiment of the present disclosure, information about a size of an original image may be obtained by using crop information, and also, size information of a cropped image may also be obtained.

FIG. 8 illustrates an example of a drone according to an embodiment of the present disclosure.

According to an embodiment of the present disclosure, variations in the angle of images photographed using a movable terminal such as a drone may be transmitted in real time. According to an embodiment of the present disclosure, a gyro sensor mounted in a drone is used to determine a rotational angle or an angular movement of the movable terminal, and based on this, a change in the angle of images may be transmitted in real time. rotation information may be determined based on a variation value of the gyro sensor and transmitted to a client.

FIG. 9 illustrates an example of setting a data protocol according to the ONVIF standard, according to an embodiment of the present disclosure.

According to an embodiment of the present disclosure, information of conversion between the coordinate system of an original image and the coordinate system of an encoding stream or information of conversion between first region information and second region information are added to Transformation of ONVIF in the form of metadata.

According to an embodiment of the present disclosure, at least one of scale information, mirror information, flip information, rotation information?), and crop information may be transmitted to the Transformation descriptor.

According to an embodiment of the present disclosure, FIG. 9 shows an origin-symmetrical image with Translate values of x=−1, y=−1 (910). It shows the origin-symmetrical image that is scale-converted by <tt:Scale x="0.00625" y="0.00834"> (920). Next, in the case of an image rotated by 90 degrees, <tt:Rotate angle="90"/> (930) may be added to the Transformation of ONVIF. Alternatively, <tt: Rotate a="cos(90)", b="−sin(90)", c="sin(90)", d="cos(90)"> or the like may be added.

In the case of a mirror image, <tt: Mirror mirror="True"/> (940) may be added.

In the case of a crop image, when a 640×840 image is generated from a 1920×1080 image and cropped, <tt:Crop x="240" y="0" cx="1440" cy="1080"> (950) is added.

Figure 10:
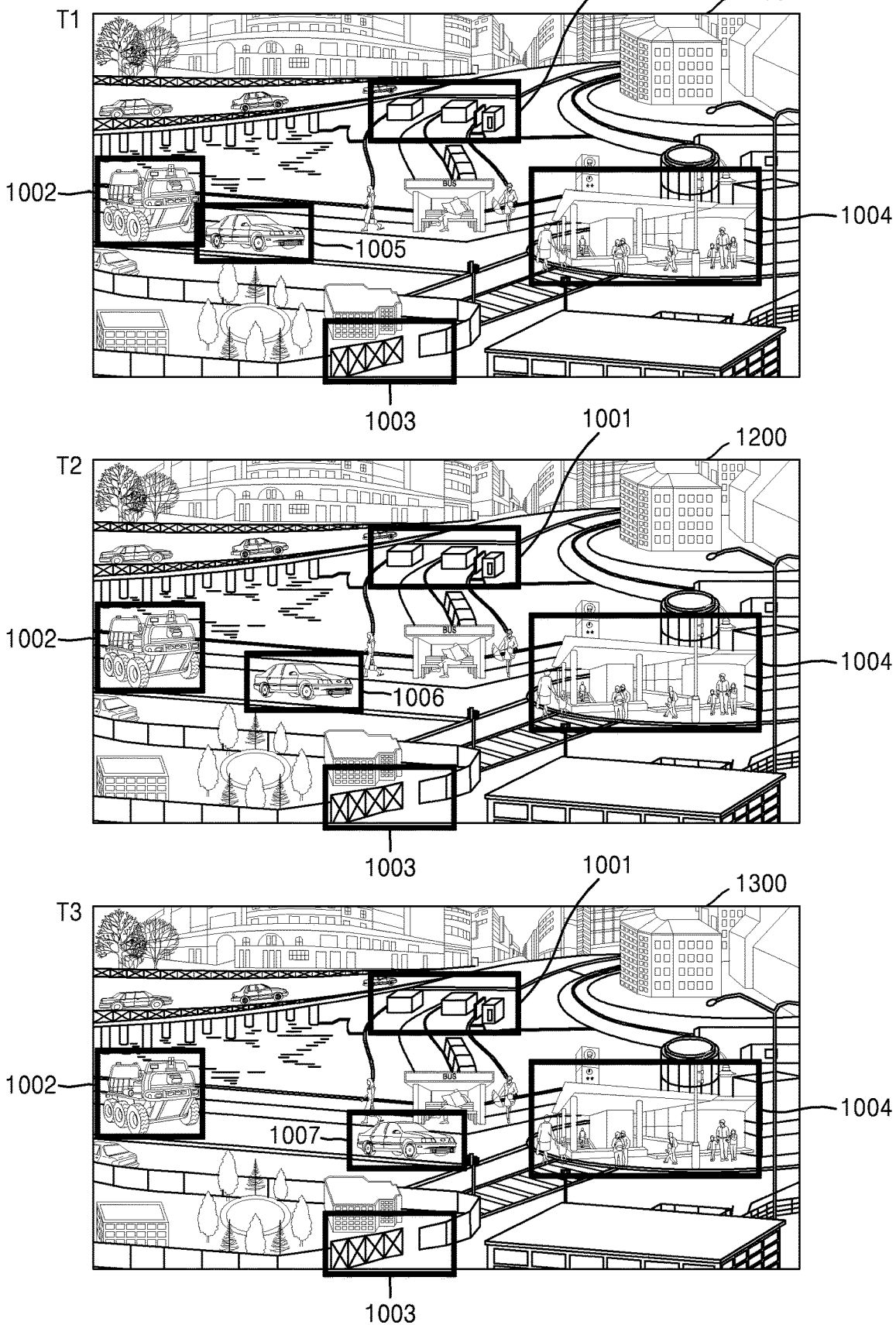
FIG. 10 illustrates an example of using dynamic cropping according to an embodiment of the present disclosure.

FIG. 10 illustrates an example of using dynamic crop according to an embodiment of the present disclosure.

According to an embodiment of the present disclosure, when a client intends to set an event image of a desired image, the coordinate system of an original image may be configured to transmit exact coordinates. On the side of a camera, no matter from which image the coordinate systems are transmitted, the transmitted coordinate system always correspond to the coordinate system of an original image, and thus, an event region of a desired image may be set without any additional conversion process or without relying on images.

In addition, a system or a client terminal that stores a received image may also store the corresponding coordinate values of an original image. When an image received from a camera includes a region cropped from an original image, and the cropped region is a dynamic crop image as illustrated in the embodiment of FIG. 10 in which the crop region is continuously changed, the coordinate values of the received image may be converted by determining to which region of the original image the current coordinate values corresponds, and the converted coordinate values may be stored. Next, when event information about a region is to be obtained from the stored image information, changes in a consistent region may be tracked by using the coordinate system of the original image.

In original images T1 (1100), T2 (1200), and T3 (1300) illustrated in FIG. 10, when there is a client terminal receiving an image stream or an encoding stream which supports Dynamic Cropping according to event regions 1001, 1002, 1003, 1004, 1005, 1006, and 1007, a time value may be received by using an existing frame, according to an embodiment of the present disclosure.

Next, information regarding whether an image is symmetrically shifted with respect to an original image and an image size of the image may be obtained, based on Translate information and scale information from the received image. In addition, by using crop information 1005, 1006, and 1007 suggested according to the present disclosure, from which region of the original image an image is cropped may be determined.

Figure 11:
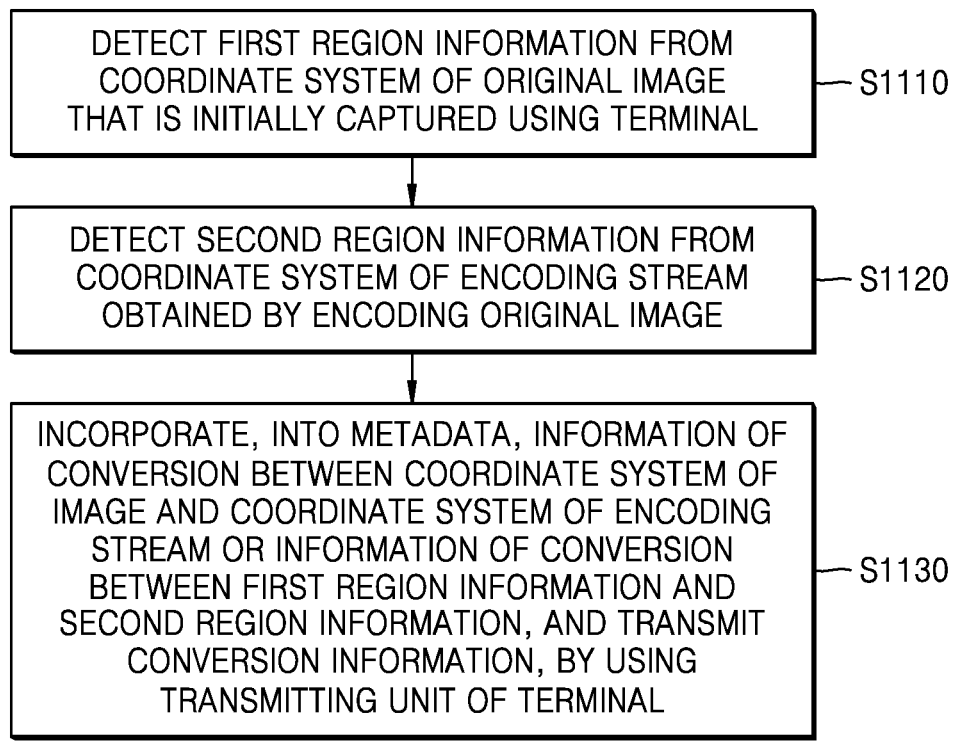
FIGS. 11 and 12 are flowcharts of a method of setting a data protocol for an image photographed using a terminal, according to an embodiment of the present disclosure.

FIG. 11 is a flowchart of setting a data protocol for an image photographed using a terminal, according to an embodiment of the present disclosure.

According to an embodiment of the present disclosure, a network camera detects first region information from the coordinate system of an initially captured original image (S1110). Next, second region information is detected from the coordinate system of an encoding stream obtained by encoding the original image (S1120). A transmitting unit of the terminal incorporates, into metadata, information of conversion between the coordinate system of the original image and the coordinate system of the encoding stream or information of conversion between the first region information and the second region information, and transmits the metadata (S1130).

According to an embodiment of the present disclosure, information of conversion between the coordinate system of an original image and the coordinate system of an encoding stream includes scale information, mirror information, flip information, rotation information or the like. Information of conversion between first region information and second region information includes crop information.

Figure 12:
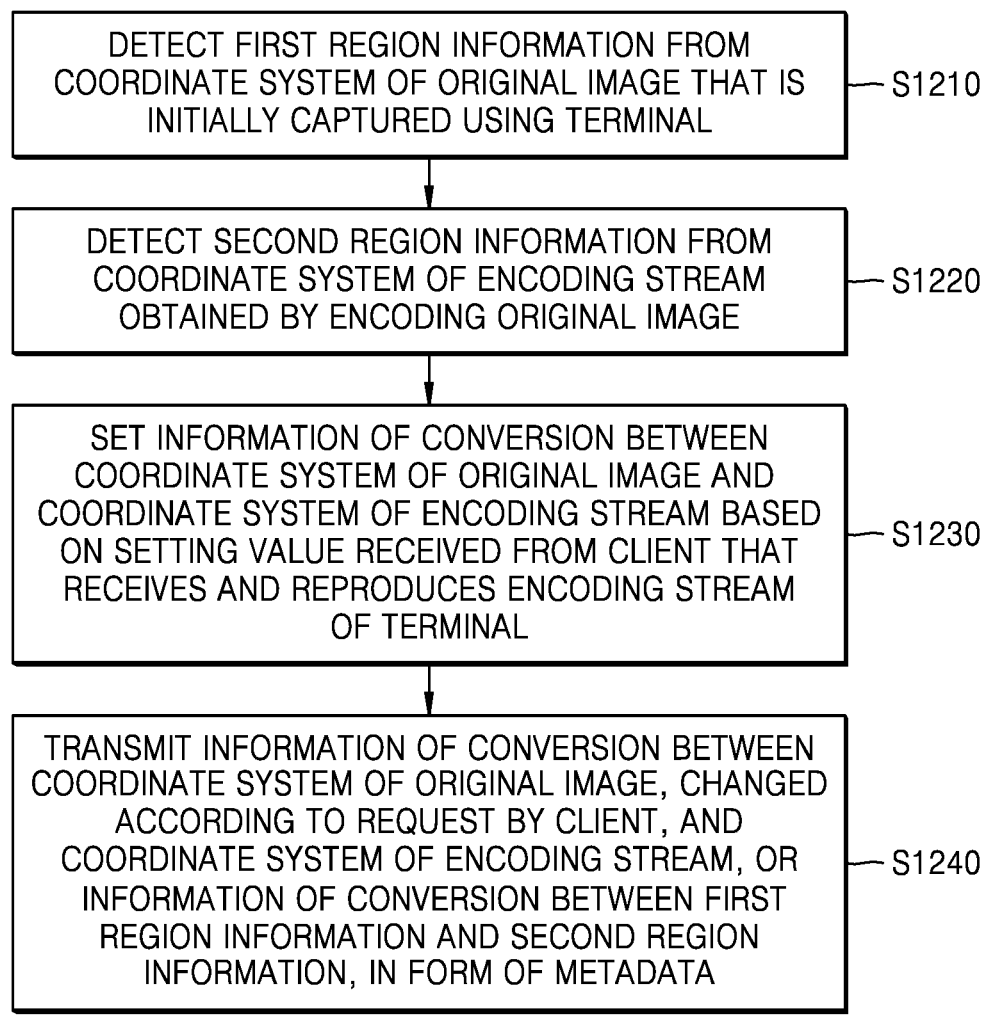

FIG. 12 is a flowchart of setting a data protocol for an image photographed using a terminal, according to another embodiment of the present disclosure.

Unlike FIG. 11, FIG. 12 illustrates a flowchart of configuring the coordinate system of an original image to transmit exact coordinates or modifying a setting by a client in the case of setting, by the client, an event region of a desired image.

First region information is detected from the coordinate system of an original image that is initially captured using a terminal (S1210). Then the terminal detects second region information from the coordinate system of an encoding stream obtained by encoding the original image (S1220). According to an embodiment of the present disclosure, in an operation of compressing the original image of the terminal, first region information and second region information are detected.

According to an embodiment of the present disclosure, when the terminal receives a setting value from the client, a coordinate system about the original image requested by the client may be configured to newly set the first region information (S1230).

Next, the terminal transmits information of conversion between the coordinate system or the original image modified according to the request of the client and the coordinate system of the encoding stream or information of conversion between the first region information and the second region information in the form of metadata (S1240).

The present disclosure can be implemented as computer readable codes on a computer-readable recording medium. Examples of the computer readable recording medium include all kinds of recording devices in which data that is readable by a computer system is stored. Examples of the computer readable recording medium include ROM, RAM, CD-ROMs, magnetic tapes, floppy disks, optical data storage devices, etc. The computer readable recording medium can also be distributed over network coupled computer systems so that the computer readable code is stored and executed in a distributed fashion.

Optimal embodiments have been disclosed herein in the drawings and the specification. Although specific terms are used herein, they are used for illustrative purpose of the present disclosure only and should not be construed as limiting the meaning or the scope of the present disclosure in the claims. Accordingly, it will be understood by those of ordinary skill in the art that various changes and other equivalent embodiments are possible without departing from the spirit and scope of the present disclosure as set forth in the following claims.

The invention claimed is:

1. A method of setting a data protocol for an image photographed using a terminal, the method comprising:
   detecting first region information from a coordinate system of an original image that is initially captured using the terminal;
   detecting second region information from a coordinate system of an encoding stream obtained by encoding the original image;
   incorporating, into metadata, information of conversion between the coordinate system of the original image and the coordinate system of the encoding stream or information of conversion between the first region information and the second region information, and transmitting the metadata, wherein the incorporating and the transmitting is performed by a transmitting unit of the terminal.

2. The method of claim 1, wherein the information of conversion between the coordinate system of the original image and the coordinate system of the encoding stream comprises at least one of a scale conversion value of an x-axis and a y-axis, a flip value of the x-axis and the y-axis, a mirror value of the x-axis and the y-axis, or a rotation value of the x-axis and the y-axis.

3. The method of claim 2, wherein the rotation value is an integer value indicating from −359 degrees to +359 degrees, and denotes a degree of x-axis rotation and y-axis rotation of the coordinate system of the original image, wherein a positive rotation value indicates clockwise rotation, and a negative rotation value indicates counterclockwise rotation.

4. The method of claim 2, wherein the rotation value is $$\begin{pmatrix} COS\Theta & -SIN\Theta \\ SIN\Theta & COS\Theta \end{pmatrix} \begin{pmatrix} x \\ y \end{pmatrix} = \begin{pmatrix} x' \\ y' \end{pmatrix}$$

displayable by using a rotation conversion matrix rotated by $\Theta$ above.

5. The method of claim 1, wherein the information of conversion between the first region information and the second region information comprises region information of a region cropped from a first region,
   wherein the region information of the cropped region is represented by a horizontal length and a vertical length of the first region information and the cropped region.

6. The method of claim 1, wherein when a resolution of the original image is different from a resolution of the encoding stream, or when a recording resolution of the original image is different from a reproduction resolution of a client terminal that receives and reproduces the encoding stream,
   the metadata comprises region information of a region cropped from the first region information, and converted values of an x-axis scale value and a y-axis scale value.

7. The method of claim 1, wherein a client terminal that receives and reproduces the encoding stream that supports Dynamic Cropping determines from which region of the first region the cropped region is cropped, by using region information of the region cropped from the first region included in the metadata, in real time.

8. The method of claim 1, wherein the transmitting unit of the terminal transmits, with respect to each frame, information of conversion between the coordinate system of the original image and the coordinate system of the encoding stream or information of conversion between the first region information and the second region information.

9. The method of claim 1, wherein, when a rotatable image sensor is mounted on the terminal, every time a rotational angle of the image sensor changes, the transmitting unit of the terminal transmits information of conversion between the coordinate system of the original image resulting from the changed rotational angle of the image sensor and the coordinate system of the encoding stream.

10. The method of claim 1, wherein, when a gyro sensor is mounted in the terminal, every time the gyro sensor detects a change in an image angle value of the terminal, the transmitting unit of the terminal transmits information of conversion between the coordinate system of the original image resulting from the change in the image angle value of the terminal and the coordinate system of the encoding stream.

11. The method of claim 10, wherein the terminal is a drone.

12. The method of claim 1 wherein a client unit that receives the metadata and an image stream transmitted by the transmitting unit of the terminal is capable of storing together the received image stream and the first region information that is determined based on the metadata.

13. The method of claim 1, wherein a data protocol for the image photographed using the terminal complies with the ONVIF standard.

14. A terminal for setting a data protocol for a photographed image, the terminal comprising:
 a controller which detects first region information indicating an original image from a coordinate system of an initially captured original image, and which detects second region information indicating an encoded image from a coordinate system of an encoding stream obtained by encoding the original image; and
 a transmitting unit which incorporates, into metadata, information of conversion between the coordinate system of the original image and the coordinate system of the encoding stream or information of conversion between the first region information and second region information, and transmits the metadata.

15. The terminal of claim 14, wherein the information of conversion between the coordinate system of the original image and the coordinate system of the encoding stream comprises at least one of a scale conversion value of an x-axis and a y-axis, a flip value of the x-axis and the y-axis, a mirror value of the x-axis and the y-axis, or a rotation value of the x-axis and the y-axis.

16. The terminal of claim 14, wherein the information of conversion between the first region information and the second region information comprises region information about a region cropped from a first region.

* * * * *